United States Patent
Hejl

(10) Patent No.: US 12,387,452 B2
(45) Date of Patent: Aug. 12, 2025

(54) AUTOMATIC ILLUMINATION SWITCHING FOR A SCANNING DEVICE USING REFLECTIONS

(71) Applicant: Hand Held Products, Inc., Charlotte, NC (US)

(72) Inventor: Benjamin Hejl, Cherry Hill, NJ (US)

(73) Assignee: Hand Held Products, Inc., Charlotte, NC (US)

( * ) Notice: Subject to any disclaimer, the term of this patent is extended or adjusted under 35 U.S.C. 154(b) by 302 days.

(21) Appl. No.: 18/050,282

(22) Filed: Oct. 27, 2022

(65) Prior Publication Data

US 2024/0144630 A1   May 2, 2024

(51) Int. Cl.
| | |
|---|---|
| *G06V 10/141* | (2022.01) |
| *G06T 7/50* | (2017.01) |
| *G06T 9/00* | (2006.01) |
| *G06V 10/60* | (2022.01) |
| *G06V 10/74* | (2022.01) |
| *G06V 10/764* | (2022.01) |

(52) U.S. Cl.
CPC ........... *G06V 10/141* (2022.01); *G06T 7/50* (2017.01); *G06T 9/00* (2013.01); *G06V 10/60* (2022.01); *G06V 10/761* (2022.01); *G06V 10/764* (2022.01); *G06T 2207/10152* (2013.01)

(58) Field of Classification Search
None
See application file for complete search history.

(56) References Cited

U.S. PATENT DOCUMENTS

| | | | |
|---|---|---|---|
| 7,543,754 | B2 | 6/2009 | He et al. |
| 7,920,179 | B2 | 4/2011 | Thorn |
| 10,740,581 | B2 | 8/2020 | Barkan et al. |
| 2016/0330374 | A1 | 11/2016 | Ilic et al. |
| 2020/0410181 | A1 | 12/2020 | Rodriguez Ortiz et al. |
| 2024/0046678 | A1* | 2/2024 | Suman ............... G06V 30/19 |

FOREIGN PATENT DOCUMENTS

EP    3092790 B1    7/2020

OTHER PUBLICATIONS

Newland, "NVH300 Angler DP", retrieved from the Internet at <URL:https://www.newland-id.com/en/products/handheld-scanners/nvh300-angler-dp> on Feb. 27, 2023, 6 pages.
Extended European Search Report Mailed on Mar. 15, 2024 for EP Application No. 23201328, 9 page(s).
Ip.Com Inc., "Specular Reflection Mitigation," IPCOM000268885D, 3 pages, (Mar. 7, 2022).

* cited by examiner

*Primary Examiner* — Quan Pham
(74) *Attorney, Agent, or Firm* — Alston & Bird LLP

(57) ABSTRACT

Various embodiments herein relate to automatically switching illumination for a scanning device based on detected reflections. In this regard, a reflection shape is detected in at least a first image related to an object associated with a direct part marking (DPM) indicia. Based on the reflection shape, one or more characteristics associated with the object are determined. Based on the one or more characteristics associated with the object, an illumination mode is selected from a plurality of illumination modes. Additionally, an illumination is projected via an illumination unit based on the illumination mode to capture a second image related to the object associated with the DPM indicia.

20 Claims, 7 Drawing Sheets

AUTOMATIC ILLUMINATION SWITCHING FOR A SCANNING DEVICE USING REFLECTIONS

TECHNICAL FIELD

Exemplary embodiments of the present disclosure generally relate to imaging systems, such as direct part marking (DPM) indicia and/or other symbology scanners, and more particularly to determining illumination configurations for imaging apparatuses for improved scanning and/or decoding of various DPM indicia types.

BACKGROUND

Generally, scanning devices such as scanners, laser scanners, image readers, optical readers, indicia readers, mobile computers, terminals, or the like read data represented by printed or displayed information bearing indicia (e.g., symbols, bar codes, quick response (QR) codes, direct part marking (DPM) codes, etc.). In general, these scanning devices scan various features, such as black and white elements of a barcode or dots/embossments on a DPM indicia, by illuminating the DPM indicia with light in order to capture an image of the DPM indicia. This captured image may be decoded or otherwise converted into text. In this way, decoding of indicia is dependent upon the way in which the indica is illuminated. However, Applicant has identified a number of deficiencies and problems associated with conventional methods of illuminating, scanning, and/or decoding indicia.

BRIEF SUMMARY

In accordance with an embodiment of the present disclosure, a system comprises a processor and a memory. The memory stores executable instructions that, when executed by the processor, cause the processor to detect a reflection shape in at least a first image related to an object associated with a direct part marking (DPM) indicia. The executable instructions, when executed by the processor, also cause the processor to determine, based on the reflection shape, one or more characteristics associated with the object. The executable instructions, when executed by the processor, also cause the processor to select, based on the one or more characteristics associated with the object, an illumination mode from a plurality of illumination modes. The executable instructions, when executed by the processor, also cause the processor to project an illumination via an illumination unit based on the illumination mode to capture a second image related to the object associated with the DPM indicia.

In accordance with another embodiment of the present disclosure, a computer-implemented method provides for detecting a reflection shape in at least a first image related to an object associated with a DPM indicia. The computer-implemented method also provides for determining, based on the reflection shape, one or more characteristics associated with the object. The computer-implemented method also provides for selecting, based on the one or more characteristics associated with the object, an illumination mode from a plurality of illumination modes. The computer-implemented method also provides for projecting an illumination via an illumination unit based on the illumination mode to capture a second image related to the object associated with the DPM indicia.

In accordance with yet another embodiment of the present disclosure, a computer program product is provided. The computer program product comprises at least one computer-readable storage medium having program instructions embodied thereon, the program instructions executable by a processor to cause the processor to detect a reflection shape in at least a first image related to an object associated with a DPM indicia. The program instructions are also executable by the processor to cause the processor to determine, based on the reflection shape, one or more characteristics associated with the object. The program instructions are also executable by the processor to cause the processor to select, based on the one or more characteristics associated with the object, an illumination mode from a plurality of illumination modes. The program instructions are also executable by the processor to cause the processor to project an illumination via an illumination unit based on the illumination mode to capture a second image related to the object associated with the DPM indicia.

BRIEF DESCRIPTIONS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
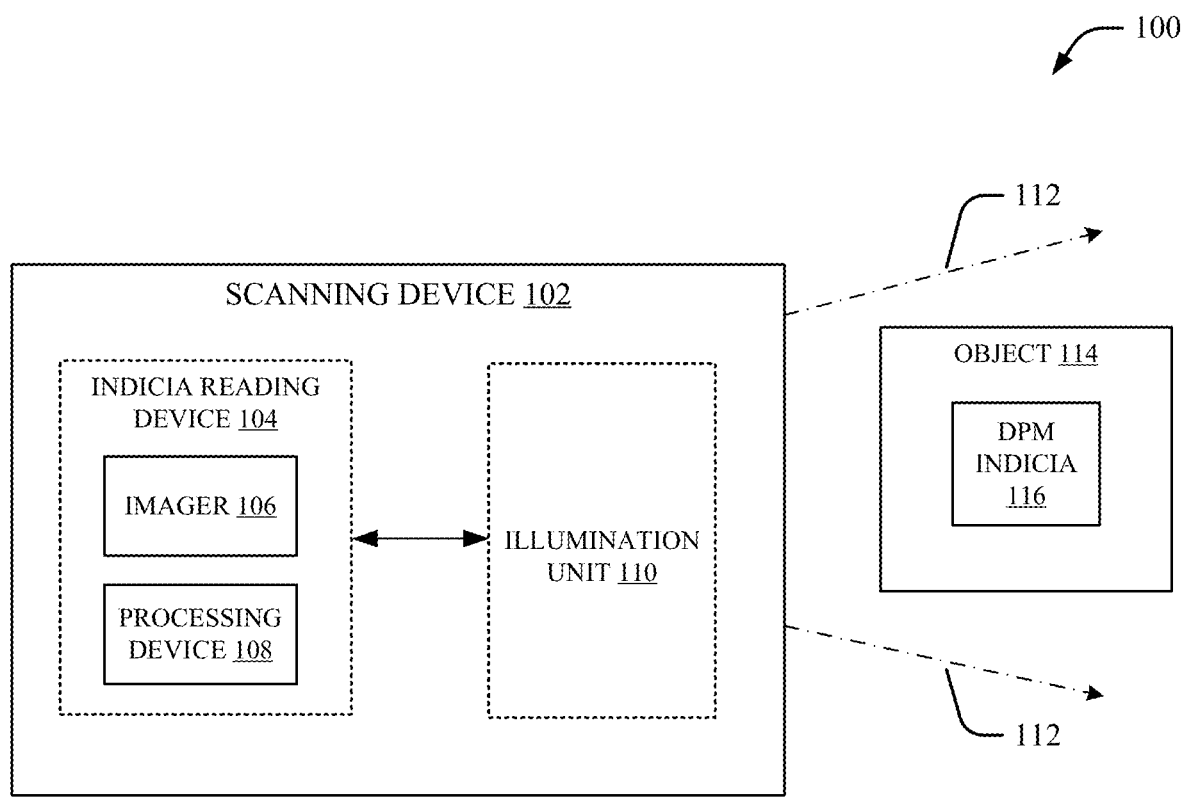
FIG. 1 illustrates a system that provides a scanning device configured for automatic illumination switching using reflections, in accordance with one or more embodiments described herein.

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative,"

"example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Generally, scanning devices such as scanners, laser scanners, image readers, optical readers, indicia readers, mobile computers, terminals, or the like read data represented by printed or displayed information bearing indicia (e.g., symbols, bar codes, quick response (QR) codes, direct part marking (DPM) codes, etc.). For example, scanning devices such as, for example, DPM indicia scanners or other sensor devices, are often employed in production-level engineering environments where it is beneficial for a part of a workpiece to be permanently and uniquely marked for identification and tracking purposes. Such environments include electronics manufacturing, automotive manufacturing, aerospace manufacturing, telecommunications, healthcare equipment and devices, and the like.

Typically, scanning devices are equipped with imagers capable of reading indicia or coded information that is etched or imprinted directly onto a surface of materials such as plastic, metal, rubber, glass, etc. For example, scanning devices can be configured to scan various features, such as black and white elements of a barcode or dots/embossments on a DPM indicia, by illuminating the DPM indicia with light in order to capture an image of the DPM indicia. This captured image may be decoded or otherwise converted into text. In this way, decoding of indicia is dependent upon the way in which the indica is illuminated.

However, Applicant has identified a number of deficiencies and problems associated with conventional methods of illuminating, scanning, and/or decoding indicia. For example, illumination of an indica can result in reflections that hinder accuracy of scanning and/or decoding of information related to the indica. These reflections can be due to the myriad of characteristics of a particular object (e.g., shape, curvature, reflectance, surface composition, surface texture, surface substrate, etc.) that includes indicia. In this regard, DPM indicia are often difficult to scan for several reasons including, but not limited to, reflectance in the form of specular reflection from a surface of an object and/or lack of contrast between actual markings or embossments and the surface of the object. Often, these marks can appear completely "washed-out" in an image being processed by a scanning device.

Accordingly, it is often desirable to employ different illumination configurations in order to successfully capture and/or decode the indicia via an optical reader. However, multiple images are often captured using different illumination configurations before a correct illumination configuration can be identified to successfully scan the DPM indicia. The time it takes to cycle through illumination configurations can adversely affect production times in an industry-level manufacturing environment. Additionally, sequentially cycling through illumination configurations can adversely affect the performance of a scanning device due to inefficient generation of illuminations. For example, inefficient usage of computing resources, battery power, and/or memory often results due to inefficient generation of illuminations by a scanning device.

Thus, to address these and/or other issues related to traditional illumination techniques by a scanning device, automatic illumination switching for a scanning device using reflections is disclosed herein. Various embodiments of the present application relate to a scanning device (e.g., a DPM indicia scanning device) which employs the automatic switching of illumination configurations (e.g., illumination modes) using light reflections identified in an image captured by the scanning device. For example, shape of reflections in a captured image can be analyzed to determine an optimal mode of illumination for a scanning device.

In various embodiments, an illumination unit in the scanning device can be employed to provide the illuminations. The illumination unit can include various components such as one or more light sources, a beam splitter module, an aimer, a lens assembly, and/or a filter module in order to provide the illuminations. In one or more embodiments, the illumination unit can be configured to generate various illumination modes to illuminate a DPM indicia. In one or more embodiments, the illumination unit can be arranged with respect to an indicia reading device comprising an imager and/or a processing device such that light rays generated by the illumination unit are converged in a direction of an imaging axis to facilitate scanning and/or decoding of the DPM indicia. In accordance with various embodiments described herein, the illumination unit may be either a part of the indicia reading device itself or may be mechanically engaged with an indicia reading device.

In one or more embodiments, a scanning device can capture one or more images of a particular object comprising DPM indicia. The scanning device can capture the one or more images using a particular illumination mode (e.g., an initial illumination mode). The scanning device can also analyze the effects of the particular illumination mode on the surface of the object. More specifically, the scanning device can detect a reflection shape in an image. The reflection shape can be a representation of the effects of the illumination unit (e.g., such as the reflection of the light rays generated by the light sources) of a scanning device on the surface of the object. For example, a reflection shape can correspond to a rectangular reflection shape, a square reflection shape, a circular reflection shape, a circular array reflection shape, and/or another type of reflection shape. In many instances, these reflection shapes can obstruct or obscure the DPM indicia in the captured image, leading to poor performance or even failure to decode the DPM indicia. Accordingly, in various embodiments, the scanning device can interpret one or more characteristics associated with an object based on the detected reflection shape in the captured image. The one or more characteristics can include shape, curvature, reflectance, surface composition, surface texture, and/or the surface substrate of the object.

Based on the one or more characteristics, the scanning device can configure the illumination unit, modify one or more illumination settings, and/or alter an illumination mode to improve quality of capturing information related to the DPM indicia. Improved scanning and/or decoding of the DPM indicia can also be provided. Adjustments can include, but are not limited to, adjusting at least one of a light intensity and/or quality value, a degree of incidence, a color value, and/or a number of light sources. For example, if the scanning device detects a round reflection shape in a captured image, the reflection shape can suggest that the surface of the object is flat and reflective, and, therefore, switching to a particular illumination mode (e.g., a diffuse illumination mode) may provide better performance and/or may lead improved decoding of the DPM indicia as compared to a different illumination mode (e.g., a polarized illumination mode) currently being employed by the illumination unit. Additionally, the scanning device can compare the detected reflection shape in a captured image to a set of known reflection shapes. Based on the comparison, the scanning device can then select a preferred illumination mode. Once an adjustment to an illumination mode is provide, or a preferred illumination mode has been selected, the scanning device can successfully scan and decode the DPM indicia. Accordingly, performance of a scanning device can be improved. For example, efficient usage of computing resources, battery power, and/or memory of a scanning device can be provided.

FIG. 1 illustrates a system 100 that provides an exemplary environment within which one or more described features of one or more embodiments of the disclosure can be implemented. The system 100 can be a scanning system employed in material handling environments such as, for example, distribution centers, shipping centers, warehouses, factories, transportation and logistics environments, and/or another type of environment where it is beneficial for an object to be uniquely marked for identification and/or tracking purposes. However, it is to be appreciated that the system 100 can be similarly implemented in a different type of application such as, for example, electronics manufacturing, automotive manufacturing, aerospace manufacturing, telecommunications, healthcare equipment and devices, access control for buildings or physical spaces, retail, healthcare, hospitality, etc. According to an embodiment, the system 100 provides a practical application of image processing and/or DPM indicia decoding with respect to one or more images to facilitate tracking and production of engineered goods, and/or technical applications associated with material handling in a warehouse, a factory, a transportation and logistics environment, and the like.

The system 100 can be related to one or more technologies to facilitate the scanning and/or decoding of DPM indicia. Moreover, the system 100 can provide an improvement to one or more technologies such as conveyor system technologies, conveyor belt technologies, robotics technologies, sensor systems, material handling technologies, sortation system technologies, mixed stock-keeping unit (SKU) depalletizing technologies, mixed SKU palletizer technologies, industrial technologies, manufacturing technologies, distribution center technologies, warehouse technologies, automation technologies, imaging technologies, asset tracking and monitoring technologies, scanning technologies, digital technologies and/or other technologies.

The system 100 includes a scanning device 102. The scanning device 102 can be a scanner (e.g., a DPM indicia scanner, a barcode scanner, etc.), a smartphone, a tablet computer, a wearable device, a handheld computing device, an augmented reality device, a virtual reality device, a sensor device, or another type of scanning device capable of capturing imagery. In certain embodiments, the scanning device 102 can be a scan engine device (e.g., a two-dimensional scan engine device or a three-dimensional scan engine device). In certain embodiments, the scanning device 102 can be fixed mechanically in position above a conveyor belt such as would be found in a manufacturing or distribution environment.

In one or more embodiments, the scanning device 102 includes an indicia reading device 104 and/or an illumination unit 110. The illumination unit 110 can be configured to generate various illumination modes to illuminate a DPM indicia 116 location on an object 114. In this regard, the illumination unit 110 is arranged with respect to, and in communication with, the indicia reading device 104. The indicia reading device 104 includes an imager 106 and/or a processing device 108. The imager 106 can be configured to obtain one or more images associated with the object 114 within a field of view 112 of the scanning device 102. The object 114 can be a physical item whose surface substrate is composed of a material such as, but not limited to, metal, plastic, rubber, glass, a semiconductor material, and/or paper. The object 114 can include the DPM indicia 116. The DPM indicia can be one or more DPM indicia to be decoded by the scanning device 102. In one or more embodiments, the processing device 108 of the indicia reading device 104 can be configured for image processing related to one or more images captured by the imager 106 and can decode the DPM indicia 116 within the one or more captured images. While a single formation of decodable indicia is illustrated and described herein, it will be appreciated that the devices of the present disclosure may be operable to capture one or more formations of decodable indicia on a single object and/or on a plurality of objects at same time.

In one or more embodiments, the imager 106 can be configured as a portion of the indicia reading device 104 that includes light-gathering devices, mirroring elements, electronic components, control components, and/or other components configured to obtain images within the field of view 112. In various embodiments, the imager 106 is executed in conjunction with one or more light sources and/or an aimer of the illumination unit 110 in order to obtain images of the DPM indicia 116. In this regard, the components of illumination unit 110 can be configured and/or arranged to work in conjunction with indicia reading device 104 in order to obtain and/or process images related to the object 114 and the DPM indicia 116.

The DPM indicia 116 can represent data in a visual machine-readable format.

Additionally, it is to be appreciated that the DPM indicia 116 can be configured in a different manner, in certain embodiments. For example, in certain embodiments, the DPM indicia 116 can be configured as a different type of indicia such as, but not limited to, a barcode, a linear barcode (e.g., a one-dimensional barcode), a two-dimensional barcode, a matrix barcode, a quick response (QR) code, or another type of machine-readable symbol configured to represent data in a visual machine-readable format.

The processing device 108 can be configured to execute one or more computing processes related to data capture and/or image processing performed by the scanning device 102. In various embodiments, the processing device 108 can be configured to perform image processing with respect to DPM indicia 116 based on the illumination mode employed by illumination unit 110 determined by the processing device 108. In various embodiments, the processing device 108 can improve the performance of the scanning device 102. For example, processing device 108 can provide improved illumination, efficiency and/or performance for the scanning device 102, improved handling of objects scanned by the scanning device 102, and/or increased speed of transportation of the objects via a material handling system, as compared to conventional material handling systems. Moreover, by performing image processing with respect to DPM indicia 116 based on the illumination mode employed by illumination unit 110 determined by the processing device 108, a number of computing resources employed by the processing device 108 can be reduced.

Figure 2:
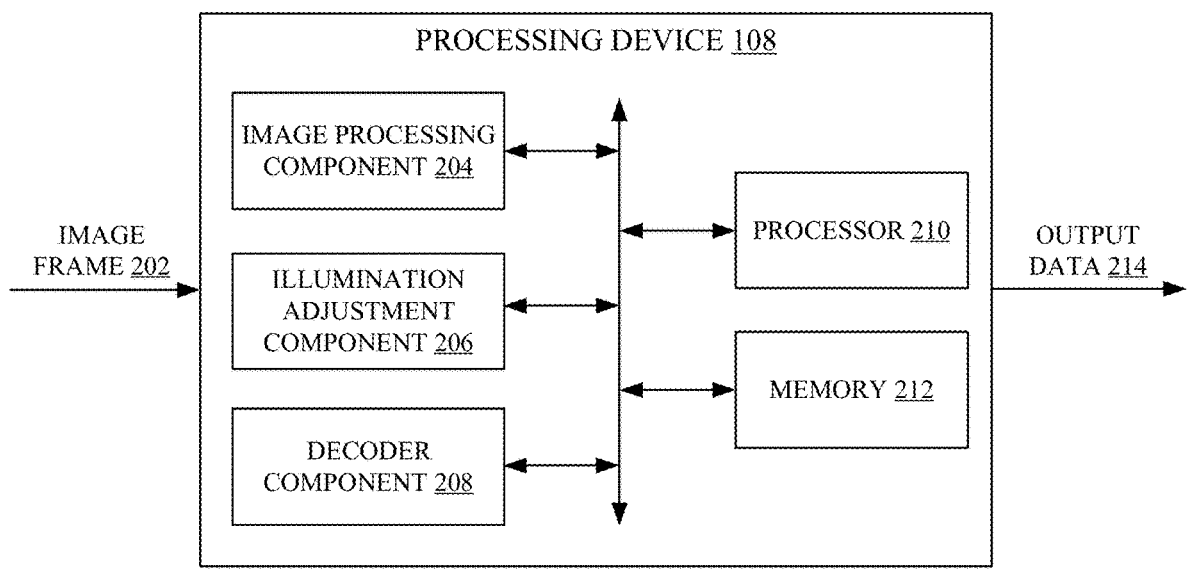
FIG. 2 is a block diagram illustrating an exemplary processing device for a scanning device configured for automatic illumination switching using reflections, in accordance with one or more embodiments described herein.

FIG. 2 illustrates an exemplary embodiment of the processing device 108 within which one or more described features of one or more embodiments of the disclosure can be implemented. The processing device 108 can include an image processing component 204, an illumination adjustment component 206 and/or a decoder component 208. Additionally, in certain embodiments, the processing device 108 can include a processor 210 and/or a memory 212. In certain embodiments, one or more aspects of the processing device 108 (and/or other systems, apparatuses and/or processes disclosed herein) can constitute executable instructions embodied within a computer-readable storage medium (e.g., the memory 212). For instance, in an embodiment, the memory 212 can store computer executable component and/or executable instructions (e.g., program instructions). Furthermore, the processor 210 can facilitate execution of the computer executable components and/or the executable instructions (e.g., the program instructions). In an example embodiment, the processor 210 can be configured to execute instructions stored in the memory 212 or otherwise accessible to the processor 210.

The processor 210 can be a hardware entity (e.g., physically embodied in circuitry) capable of performing operations according to one or more embodiments of the disclosure. Alternatively, in an embodiment where the processor 210 is embodied as an executor of software instructions, the software instructions can configure the processor 210 to perform one or more algorithms and/or operations described herein in response to the software instructions being executed. In an embodiment, the processor 210 can be a single core processor, a multi-core processor, multiple processors internal to the processing device 108, a remote processor (e.g., a processor implemented on a server), and/or a virtual machine. In certain embodiments, the processor 210 can be in communication with the memory 212, the image processing component 204, the illumination adjustment component 206 and/or the decoder component 208 via a bus to, for example, facilitate transmission of data among the processor 210, the memory 212, the image processing component 204, the illumination adjustment component 206 and/or the decoder component 208. The processor 210 can be embodied in a number of different ways and can, in certain embodiments, include one or more processing devices configured to perform independently. Additionally, or alternatively, the processor 210 can include one or more processors configured in tandem via a bus to enable independent execution of instructions, pipelining of data, and/or multi-thread execution of instructions. The memory 212 can be non-transitory and can include, for example, one or more volatile memories and/or one or more non-volatile memories. In other words, for example, the memory 212 can be an electronic storage device (e.g., a computer-readable storage medium). The memory 212 can be configured to store information, data, content, one or more applications, one or more instructions, or the like, to enable the processing device 108 to carry out various functions in accordance with one or more embodiments disclosed herein. As used herein in this disclosure, the term "component," "system," "device," and the like, can be and/or can include a computer-related entity. For instance, "a component," "a system," "a device," and the like disclosed herein can be either hardware, software, or a combination of hardware and software. As an example, a component can be, but is not limited to, a process executed on a processor, a processor, circuitry, an executable component, a thread of instructions, a program, and/or a computer entity.

The processing device 108 can receive an image frame 202. The image frame 202 can be an image and/or an image frame of image data captured by the scanning device 102. For example, the image frame 202 can be an image and/or an image frame of image data captured by the imager 106 of the scanning device 102. The image frame 202 can be encoded and/or represented in one or more formats such as JPEG, Bitmap, PNG, RAW, and/or another type of data format and can be analyzed by image processing component 204. The image frame 202 can also respectively include a set of pixels configured as a grouping of pixels by image processing component 204. In various embodiments, the grouping of pixels for the image frame 202 can also be mapped into matrix representations via the image processing component 204. In such embodiments, the matrix values can represent coordinates that relate to the positions of objects in frames of image data. For example, the relative location of captured DPM indicia (e.g., DPM indicia 116) can be expressed as matrix coordinates. In certain embodiments, the location of a reflection shape can be expressed in a matrix and/or matrix coordinates can be stored, for example, in memory 212 of processing device 108. The reflection shape can be a representation of the effects of an illumination unit (e.g., such as the reflection of the light rays generated by light sources) of a scanning device (e.g., the scanning device 102) on a surface of an object (e.g., the object 114). For example, the reflection shape can correspond to a rectangular reflection shape, a square reflection shape, a circular reflection shape, a circular array reflection shape, and/or another type of reflection shape. Additionally, in various embodiments, the reflection shape can be a predetermined reflection shape associated with a previously detected reflection. In various embodiments, the image frame 202 can be an image frame related to an object (e.g., the object 114) associated with DPM indicia (e.g., the DPM indicia 116) and can be analyzed by image processing component 204 of processing device 108.

In one or more embodiments, the image processing component 204 of the processing device 108 can analyze the image data of image frames (e.g., image frame 202) to detect objects such as DPM indicia and reflection shapes (e.g., DPM indicia 116 and reflection shape 602 respectively). Upon detecting a reflection shape, the image processing component 204 can compile one or more characteristics about the surface of the object (e.g., object 114) based on the detected reflection shape (e.g., reflection shape 602 illustrated in FIG. 6). The one or more characteristics compiled by the image processing component 204 comprises the shape, curvature, reflectance, surface composition, surface texture, surface substrate, and/or the like of an object (e.g., the object 114). In one or more embodiments, the one or more characteristics can be stored and updated in the memory 212 of the processing device 108. Additionally, the image processing component 204 can compare the detected reflection shape in a captured image to a set of known reflection shapes in memory.

The image processing component 204 can additionally select a preferred illumination mode based on the comparison. For example, image processing component 204 can analyze image frame 202 and detect a reflection shape and compare the reflection shape to a database of known reflection shapes. In various embodiments, a database of known reflection shapes can be stored and updated in memory 212 of the processing device 108 of a scanning device (e.g., scanning device 102). Upon detecting a known reflection shape upon a particular object (e.g., object 114), the image processing component 204 can direct the illumination adjustment component 206 to switch the illumination mode to a preferred illumination mode to suit the characteristics of the particular object. Preferred illumination modes for illuminating the DPM indicia 116 include, but are not limited to, a direct illumination mode, an indirect illumination mode, a diffused illumination mode, a polarized illumination mode, a dark-field illumination mode, a bright-field illumination mode, a diffuse on-axis (co-axial) illumination mode, a diffuse dome illumination mode, an ambient illumination mode, and/or or more other illumination modes.

Figure 6:
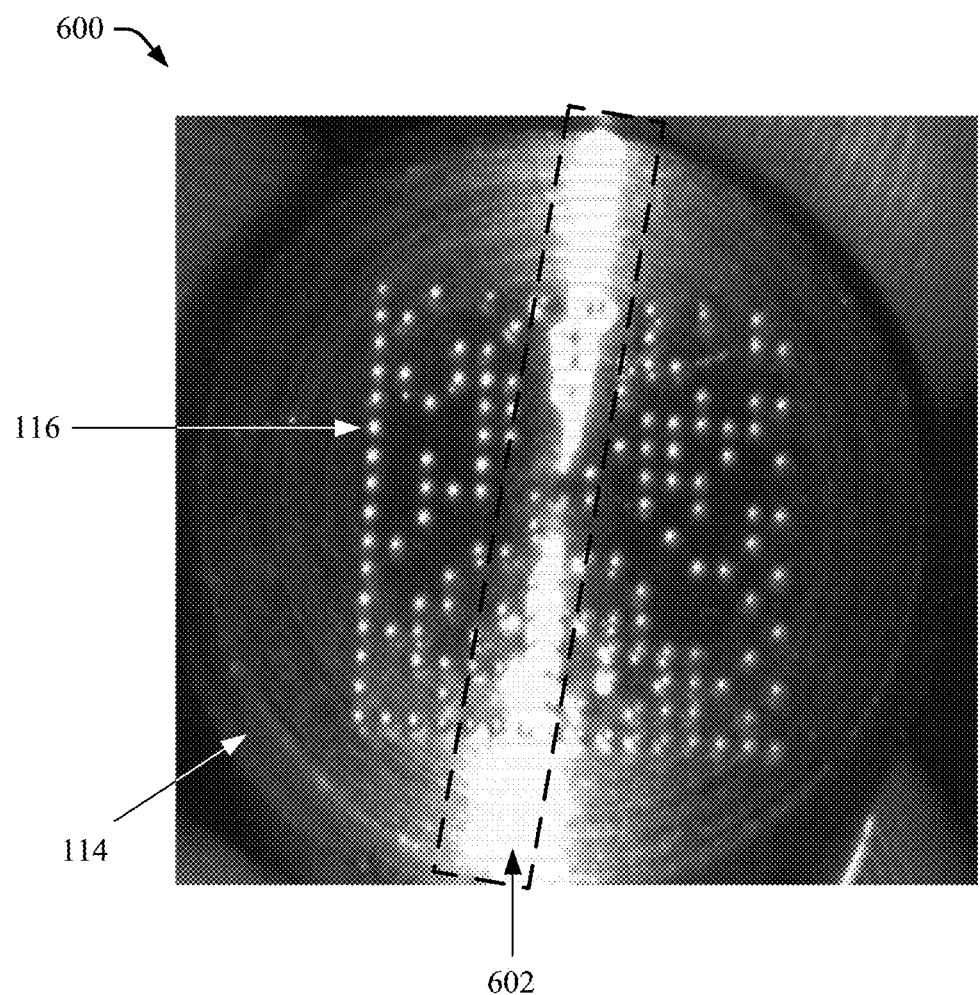
FIG. 6 illustrates an exemplary image, in accordance with one or more embodiments described herein.

The image processing component 204 can also detect when reflection shapes obstruct or obscure DPM indicia on an object. For example, image 600 presented in FIG. 6 depicts an exemplary object containing DPM indicia that is being obstructed by a reflection shape. Reflection shapes can be influenced by many factors including, but not limited to, the shape, curvature, reflectance, surface composition, surface texture, surface substrate, and/or the like of the object. Furthermore, reflection shapes can be influenced by the configuration of the components within the illumination unit (e.g., illumination unit 110) of a scanning device (e.g., scanning device 102). Illumination components such as light sources and their orientation, lenses, filters, aimers, and the like can all contribute to an impeding reflection shape if they are not configured properly. Greater detail of illumination unit 110 and related illumination components is presented below in reference to FIG. 3.

In various embodiments, the illumination adjustment component 206 can determine one or more adjustments for the illumination unit 110 to make based on image data processed by the image processing component 204. For example, the image processing component 204 may detect a reflection shape impeding upon the DPM indicia on an object (e.g., DPM indicia 116 and object 114 respectively). Based on the detected reflection shape, the illumination adjustment component 206 can determine one or more adjustments to be employed by the illumination unit 110 to improve a scan of the DPM indicia. In certain embodiments, the processor 210 of the processing device 108 can compile the necessary adjustments, along with the processed image data, as output data (e.g., output data 214). The output data 214 can be used to instruct the illumination unit 110 to switch or adjust illumination modes. After adjustments are made or illumination modes are switched based on the analysis of an image by the processing device (e.g., processing device 108), the scanning device 102 can capture another image of the object to be analyzed and decoded.

Upon a successful scan, the processing device 108 can compile data related to the decoded DPM indicia. For example, the image processing component 204 can analyze an image (e.g., image frame 202) and/or detect a DPM indicia (e.g., DPM indicia 116). The decoder component 208 can decode the detected DPM indicia 116 and the processor 210 can compile the decoded data into output data (e.g., output data 214). Additionally or alternatively, there are instances in which the image processing component 204 does not detect a reflection shape, and, as such, the absence of a reflection shape can indicate that the DPM indicia is unobstructed. In such instances, the decoder component 208 will attempt to decode the DPM indicia detected by image processing component 204, and, if successful, the processor 210 can compiled the decoded indicia data as output data (e.g., output data 214).

In one or more embodiments, the illumination adjustment component 206 can detect a reflection shape in at least a first image (e.g., the image frame 202) related to the object 114 associated with the DPM indicia 116. For example, the illumination adjustment component 206 can detect a reflection shape in one or more images related to a first illumination mode (e.g., an original illumination mode) employed to capture the object 114 associated with the DPM indicia 116 via the one or more images. The illumination adjustment component 206 can also determine, based on the reflection shape, one or more characteristics associated with the object 114. Based on the one or more characteristics associated with the object 114, the illumination adjustment component 206 can select an illumination mode from a plurality of illumination modes. The plurality of illumination modes can include a direct illumination mode, an indirect illumination mode, a diffused illumination mode, a polarized illumination mode, a dark-field illumination mode, a bright-field illumination mode, a diffuse on-axis (co-axial) illumination mode, a diffuse dome illumination mode, an ambient illumination mode, and/or or more other illumination modes.

In one or more embodiments, the illumination adjustment component 206 can determine a shape of the object 114 and/or a surface type of the object 114 based on the reflection shape. Additionally, the illumination adjustment component 206 can select the illumination mode from the plurality of illumination modes based on the shape of the object 114 and/or the surface type of the object 114. A shape of the object 114 can be, for example, a circular shape, a square shape, a rectangular shape, a cube shape, a cylinder shape, a sphere shape, and/or another type of shape. A surface type of the object 114 can be, for example, metal, plastic, rubber, glass, a semiconductor material, paper, and/or another surface type.

In certain embodiments, the illumination adjustment component 206 can generate a feature set associated with the reflection shape. Additionally, the illumination adjustment component 206 can apply the feature set to a machine learning model to determine a classification for the object 114. The machine learning model can be a neural network model, a classifier model, or another type of machine learning model. The classification for the object 114 can be, for example, a shape classification and/or a surface type classification for the object 114. Additionally, the illumination adjustment component 206 can select the illumination mode from the plurality of illumination modes based on the classification for the object 114.

In another embodiment, the machine learning model can be configured to determine (e.g., select) the illumination mode from the plurality of illumination modes. For example, the illumination adjustment component 206 can apply the feature set to a machine learning model configured to determine a preferred illumination mode from the plurality of illumination modes for the object 114 associated with the DPM indicia 116.

Additionally, the illumination adjustment component 206 can project an illumination via the illumination unit 110 based on the illumination mode to capture a second image related to the object 114 associated with the DPM indicia 116. In various embodiments, the illumination adjustment component 206 can alter one or more illumination characteristics (e.g., one or more illumination settings, one or more illumination configurations, etc.) of the illumination unit 110 based on the one or more characteristics associated with the object 114 to select the illumination mode for the illumination unit 110. The one or more illumination characteristics can include an intensity value, a quality value, a degree of incidence, a color value, a number of light sources, and/or one or more other illumination characteristics of the illumination unit 110.

In one or more embodiments, the decoder component 208 can decode, from the second image, information associated with the DPM indicia 116. In certain embodiments, the decoder component 208 can determine a degree of reflection in the second image related to the object 114 associated with the DPM indicia 116. Additionally, the decoder component 208 can decode, from the second image, information associated with the DPM indicia 116 in response to a determination that the degree of reflection satisfies a defined reflection level.

In certain embodiments, the illumination adjustment component 206 can detect a second reflection shape in the second image related to the object 114 associated with the DPM indicia 116. Additionally, the decoder component 208 can decode, from the first image or the second image, information associated with the DPM indicia 116 based on a comparison between the first reflection shape and the second reflection shape. For example, the decoder component 208 can select either the first image or the second image for decoding of the DPM indicia 116 based on a degree of reflection respectively include in the first image and the second image.

Figure 3:
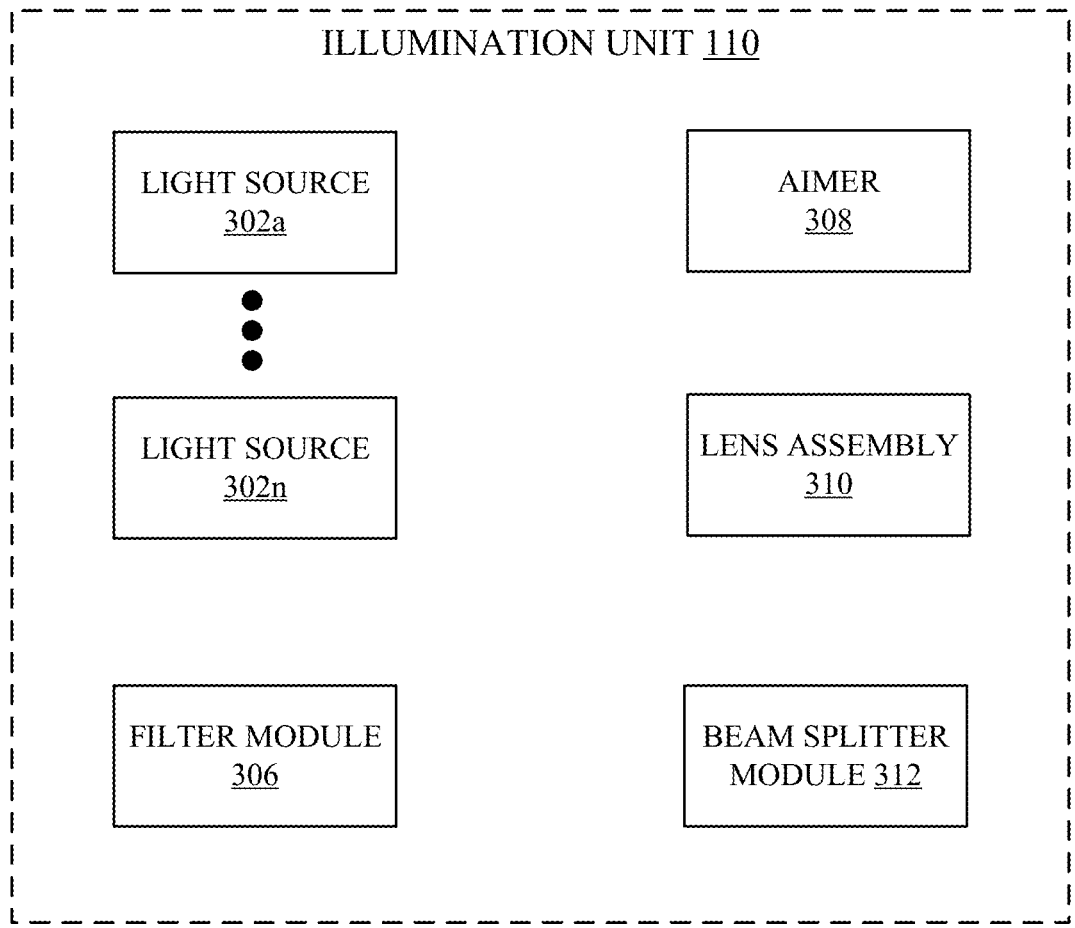
FIG. 3 is a block diagram illustrating various hardware elements of an illumination unit for a scanning device configured for automatic illumination switching using reflections, in accordance with one or more embodiments described herein.

FIG. 3 is a block diagram illustrating various hardware elements of the illumination unit 110 configured for automatic illumination switching using reflections in accordance with one or more example embodiments described herein. Various embodiments of the illumination unit 110 of the present disclosure can be configured and arranged in different configurations, without limitation, to achieve one or more of the technical improvements discussed above. Illumination unit 110 comprises one or more light sources (e.g., one or more light sources 302a-n), that can be arranged in multiple patterns and orientations depending on the application of the system 100. The one or more light sources 302a-n can include, but are not limited to, bar lights, ring lights, dome lights, and/or light emitting diodes (LEDs) in various configurations. The one or more light sources 302a-n may be employed in different positions (e.g., the one or more light sources 302a-n can illuminate the object 114 from different sides). In various embodiments that comprise four or more light sources, the indicia reading device 104 can direct the illumination unit 110 can illuminate the object 114 from top/bottom or left/right positions depending on the surface composition of the object 114. For example, lighting a curved and/or textured object from two sides is ideal to reduce the chances of generating an impeding reflection shape (e.g., reflection shape 602). Under instruction from the indicia reading device 104, the illumination unit 110 can alter the orientation (e.g., alter the direction and/or the angle of incidence) of the one or more light sources 302a-n respectively. For example, based on image data comprising a reflection shape impeding on DPM indicia (e.g., reflection shape 602 impeding on DPM indicia 116) processed by image processing component 204, the illumination adjustment component 206, by way of the processing device 108, may instruct the illumination unit 110 to alter the orientation, direction, or angle of incidence of the one or more light sources 302a-n respectively to improve the system 100.

Illumination unit 110 also comprises a filter module 306. In various embodiments, the filter module 306 comprises one or more diffractive optical elements, one or more diffusers, one or more color filters, and/or one or more polarizers. The one or more diffractive elements can be configured to decompose light beams into component frequencies (wavelengths). Each of the one or more diffractive optical elements can direct a specific part of the light beams in a specific direction or onto a specific focal point. In various embodiments, the diffractive optical elements in the filter module 306 may be transmissive optical elements, and/or reflective optical elements. In various embodiments, the one or more diffusers of the filter module 306 may be configured to convert incident light beams, such as light beams generated from the one or more light sources 302a-n, into clusters of scattered rays and may be individually enabled or disabled based on the illumination mode of the illumination unit 110. Furthermore, the one or more color filters and/or the one or more polarizers in the filter module 306 can be employed to create contrast (e.g., lighten or darken features of an object) and/or reduce glare and "hot spots" in an image (e.g., image frame 202).

In certain embodiments, illumination unit 110 can employ the aimer 308 to project an aimer pattern onto the DPM indicia 116 associated with object 114. The aimer pattern can be used to assist in aiming the imager 106 of the scanning device 102 to accurately capture images (e.g., image frame 202) of the DPM indicia 116 of the object 114. The aimer 308 can be a laser aimer, a light source aimer, an LED aimer, or another type of aimer configured to project an aimer pattern. The aimer pattern can be a laser aimer pattern, a light source aimer pattern, an LED aimer pattern, or another type of aimer pattern projected onto the object 114. In one or more embodiments, the aimer pattern can be configured as a customizable pattern (e.g., a customizable light source pattern) and/or a predefined pattern (e.g., a predefined light source pattern) projected by the aimer 308 onto DPM indicia 116.

In various embodiments, illumination unit 110 also comprises a lens assembly 310. The lens assembly can comprise one or more lenses configured and arranged to direct and/or capture light beams (such as from the one or more light sources 302a-n). Lens assembly 310 can be an objective lens mechanically incorporated into the housing assembly of a scanning device proximate to a field of view of the scanning device, or "window", such that light beams (e.g., from the one or more light sources 302a-n) reflecting off an object (e.g., object 114) can be received by the imager (e.g., imager 106) of the scanning device. Additionally or alternatively, lens assembly 310 can comprise a telecentric lens through which collimated, or "in-line", light beams can be simultaneously directed towards an object to illuminate DPM indicia and received by the imager (e.g., imager 106). In various embodiments, the beam splitter module 312 can be configured and arranged in conjunction with the lens assembly 310 and the one or more light sources 302a-n, and filter module 306 to direct and receive light beams based on the illumination mode of the illumination unit 110. Illumination modes for illuminating the DPM indicia 116 include, but are not limited to, a direct illumination mode, an indirect illumination mode, a diffused illumination mode, a polarized illumination mode, a dark-field illumination mode, a bright-field illumination mode, a diffuse on-axis (co-axial) illumination mode, a diffuse dome illumination mode, an ambient illumination mode, and/or or more other illumination modes.

Figure 4:
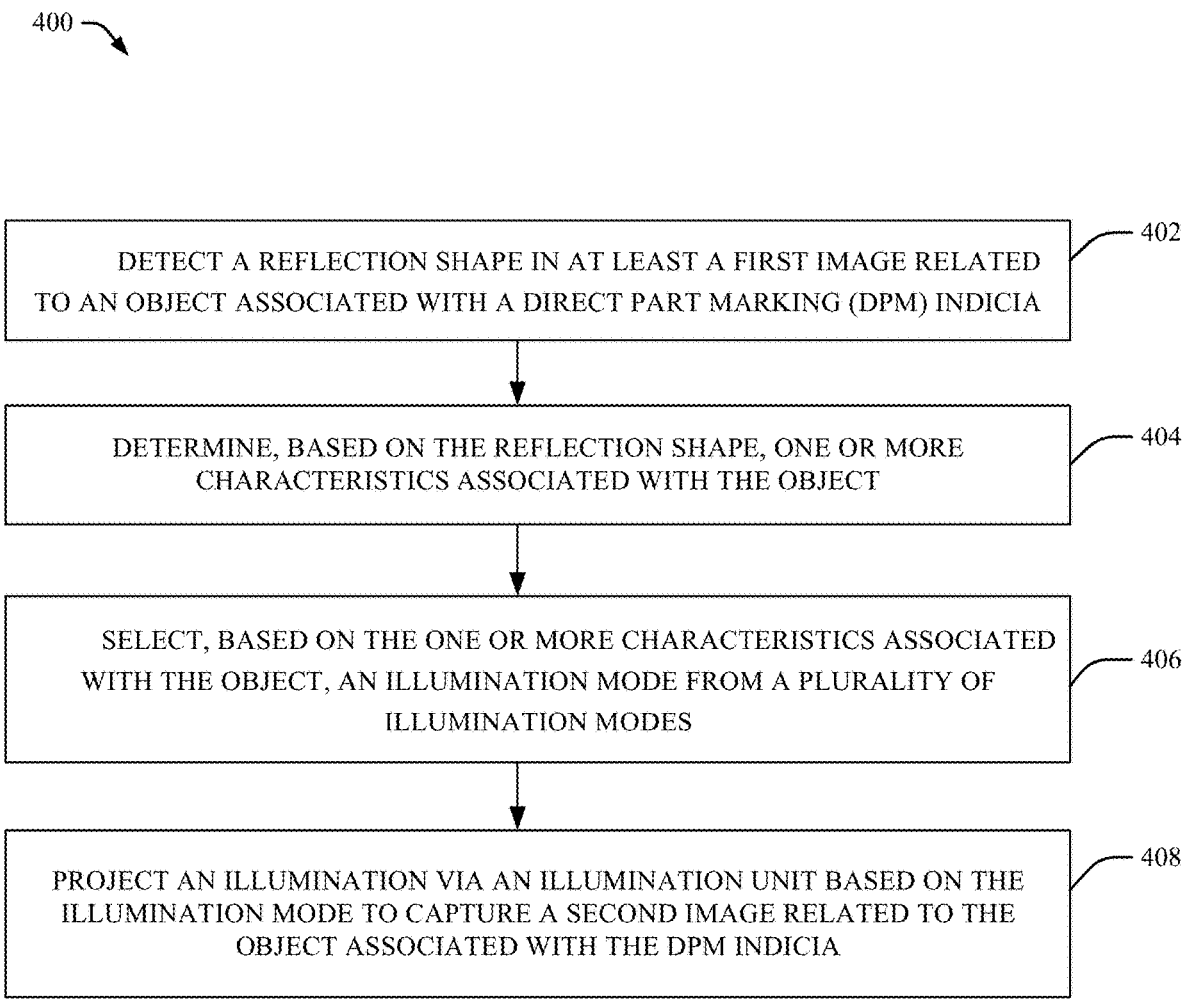
FIG. 4 is a flow diagram illustrating automatic illumination switching using reflections, in accordance with one or more embodiments described herein.

FIG. 4 illustrates a computer-implemented method 400 for automatically switching illumination based on reflections in accordance with one or more embodiments described herein. In one or more embodiments, the computer-implemented method 400 can be employed by the processing device 108. In various embodiments, the computer-implemented method 400 provides for automatically switching the illumination mode of a scanning device (e.g., re-configuring the components of the illumination unit 110 of scanning device 102) based on a reflection shape so as to improve the efficiency and accuracy of the scanning device by correctly illuminating DPM indicia associated with an object (e.g., the DPM indicia 116 associated with object 114). In one or more embodiments, the computer-implemented method 400 begins at step 402 where a reflection shape in at least a first image related to an object associated with a direct part marking (DPM) indicia is detected. The computer-implemented method 400 also includes a step 404 where one or more characteristics associated with the object are determined based on the reflection shape. The computer-implemented method 400 also includes a step 406 where an illumination mode is selected from a plurality of illumination modes based on the one or more characteristics associated with the object. The computer-implemented method 400 also includes a step 408 where an illumination is projected via an illumination unit based on the illumination mode to capture a second image related to the object associated with the DPM indicia.

In one or more embodiments, the computer-implemented method 400 additionally or alternatively includes determining a shape of the object based on the reflection shape. In one or more embodiments, the computer-implemented method 400 additionally or alternatively includes selecting the illumination mode from the plurality of illumination modes based on the shape of the object.

In one or more embodiments, the computer-implemented method 400 additionally or alternatively includes determining a surface type of the object based on the reflection shape. In one or more embodiments, the computer-implemented method 400 additionally or alternatively includes selecting the illumination mode from the plurality of illumination modes based on the surface type of the object.

In one or more embodiments, the computer-implemented method 400 additionally or alternatively includes generating a feature set associated with the reflection shape. In one or more embodiments, the computer-implemented method 400 additionally or alternatively includes applying the feature set to a machine learning model to determine a classification for the object. In one or more embodiments, the computer-implemented method 400 additionally or alternatively includes selecting the illumination mode from a plurality of illumination modes based on the classification for the object.

In one or more embodiments, the computer-implemented method 400 additionally or alternatively includes generating a feature set associated with the reflection shape. In one or more embodiments, the computer-implemented method 400 additionally or alternatively includes applying the feature set to a machine learning model configured to determine the illumination mode from the plurality of illumination modes.

In one or more embodiments, the computer-implemented method 400 additionally or alternatively includes altering one or more illumination characteristics of the illumination unit based on the one or more characteristics associated with the object.

In one or more embodiments, the computer-implemented method 400 additionally or alternatively includes decoding, from the second image, information associated with the DPM indicia.

In one or more embodiments, the computer-implemented method 400 additionally or alternatively includes determining a degree of reflection in the second image related to the object associated with the DPM indicia. In one or more embodiments, the computer-implemented method 400 additionally or alternatively includes decoding, from the second image, information associated with the DPM indicia in response to a determination that the degree of reflection satisfies a defined reflection level.

In one or more embodiments, the reflection shape is a first reflection shape and the computer-implemented method 400 additionally or alternatively includes detecting a second reflection shape in the second image related to the object associated with the DPM indicia. In one or more embodiments, the computer-implemented method 400 additionally or alternatively includes decoding, from the first image or the second image, information associated with the DPM indicia based on a comparison between the first reflection shape and the second reflection shape.

Figure 5:
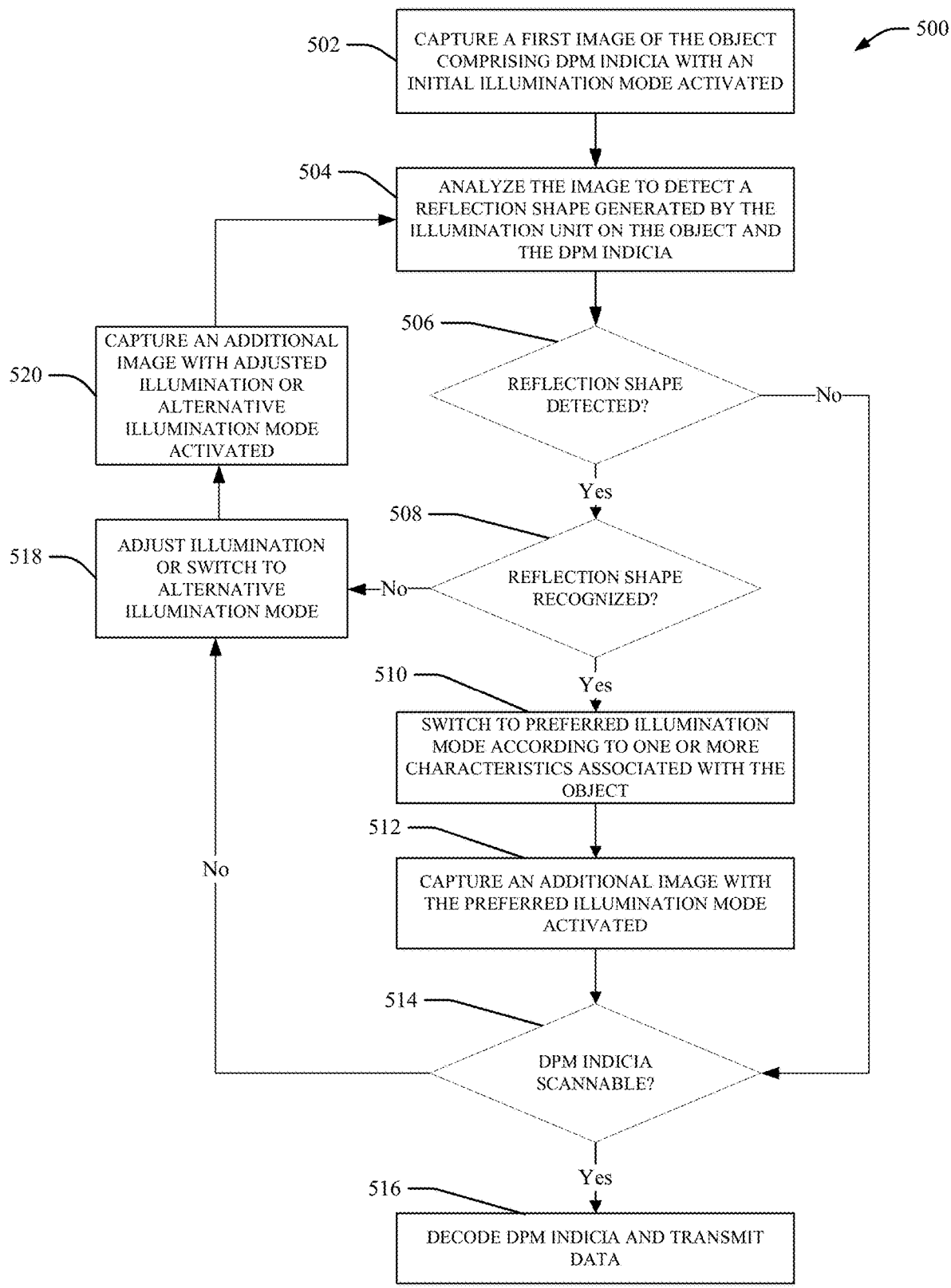
FIG. 5 is another flow diagram illustrating automatic illumination switching using reflections, in accordance with one or more embodiments described herein.

FIG. 5 illustrates a computer-implemented method 500 for automatically switching illumination based on reflections in accordance with one or more embodiments described herein. In one or more embodiments, the computer-implemented method 500 can be employed by the processing device 108. In various embodiments, the computer-implemented method 500 provides for automatically switching the illumination mode of a scanning device (e.g., re-configuring the components of the illumination unit 110 of scanning device 102) based on a reflection shape so as to improve the efficiency and accuracy of the scanning device by correctly illuminating DPM indicia associated with an object (e.g., the DPM indicia 116 associated with object 114). In one or more embodiments, the computer-implemented method 500 begins at step 502 where an image of an object comprising DPM indicia is captured by a scanning device while an initial illumination mode is activated. For example, DPM indicia associated with object 114 can be captured in image frame 202 by the scanning device 102 while an initial illumination mode is activated. The initial illumination modes can be, but is not limited to, a direct illumination mode, an indirect illumination mode, a diffused illumination mode, a polarized illumination mode, a dark-field illumination mode, a bright-field illumination mode, a diffuse on-axis (co-axial) illumination mode, a diffuse dome illumination mode, an ambient illumination mode, and/or another illumination mode.

The computer-implemented method 500 also includes a step 504 where the captured image is analyzed to detect a reflection shape generated by the illumination unit on the object, as well as the DPM indicia associated with the object. The computer-implemented method 500 also includes a step 506 that determines whether a reflection shape was detected in the first captured image. In various embodiments, if a reflection shape is not detected (e.g., the illumination mode is potentially appropriate for one or more characteristics of the object), the computer-implemented method 500 proceeds to step 514 to determine whether the DPM indicia is scannable.

Alternatively, if a reflection shape is detected, the computer-implemented method 500 can proceed to step 508. At step 508, the processing device of the scanning device (e.g., processing device 108 of scanning device 102) can determine if the detected reflection shape matches a known reflection shape in memory (e.g., a reflection shape database comprised in memory 212). If the reflection shape is not recognized, the computer-implemented method 500 can proceed to step 518 where the illumination mode can be adjusted. Alternatively, if the reflection shape is recognized, computer-implemented method 500 can proceed to step 510.

The computer-implemented method 500 includes a step 510 where the processing device can direct the illumination unit to switch to a preferred illumination mode according to one or more characteristics of the object. The one or more characteristics of the object can be determined based on the recognized reflection shape. In one or more embodiments, the illumination adjustment component 206 of processing device 108 of the indicia reading device 104 can direct the illumination unit 110 to reconfigure one or more illumination unit components (e.g., the one or more light sources 302a-n, the filter module 306, etc.) to match a preferred illumination mode. The preferred illumination mode can be different than the initial illumination mode. Additionally, the preferred illumination mode can be, but is not limited to, a direct illumination mode, an indirect illumination mode, a diffused illumination mode, a polarized illumination mode, a dark-field illumination mode, a bright-field illumination mode, a diffuse on-axis (co-axial) illumination mode, a diffuse dome illumination mode, an ambient illumination mode, and/or another illumination mode.

The computer-implemented method 500 can proceed to step 512 where the scanning device captures an additional image with the preferred illumination mode activated. The computer-implemented method 500 can proceed to step 514, in which the processing device 108, by way of the image processing component 204, can analyze the additional image to detect potential impeding reflection shapes and/or the DPM indicia 116 to determine if the DPM indicia 116 is scannable (e.g., unimpeded and clear enough to decode). In response to a determination that the DPM indicia 116 is scannable, the computer-implemented method 500 proceeds to step 516 where the DPM indicia 116 is decoded, and the decoded data is transmitted. Alternatively, in response to a determination that the DPM indicia from step 514 is not scannable, the computer-implemented method 500 proceeds to step 518.

The computer-implemented method 500 includes a step 518 where the processing device 108 of indicia reading device 104, in conjunction with the illumination unit 110, adjusts the current illumination mode or switches to an alternative illumination mode completely. For example, the illumination adjustment component 206 can instruct, via the processing device 108, the illumination unit 110 to adjust is current configuration, where an adjustment can include, but is not limited to, adjusting at least one of a light intensity value and/or quality value, a degree of incidence, a color value, and/or a number of light sources. The illumination unit 110 can, among other things, alter the intensity of the one or more light sources 302a-n and/or the configuration of the filter module 306 in order to satisfy the instructions of the illumination adjustment component 206. The computer-implemented method 500 can proceed to step 520 where an additional image can be captured with the adjusted illumination or alternative illumination mode activated. In various embodiments, the computer-implemented method 500 can return to step 504 where the captured image can be analyzed to detect a reflection shape generated by the illumination unit on the object, as well as the DPM indicia associated with the object, and thus proceed through the subsequent steps in order to improve the accuracy and efficiency of the scanning device 102.

FIG. 6 illustrates an image 600 according to one or more embodiments of the disclosure. The image 600 can be an image captured by the scanning device 102. For example, the image 600 can be an image captured by the imager 106 of the scanning device 102. The image 600 can be encoded and/or represented in one or more formats such as JPEG, Bitmap, PNG, RAW, and/or another type of data format. The image 600 can also respectively include a set of pixels configured as a grouping of pixels. In one or more embodiments, the scanning device 102 (e.g., the imager 106 of the scanning device 102) can capture the image 600 using an illumination mode of the scanning device 102. For instance, the image 600 can include the object 114, the DPM indicia 116, and the reflection shape 602. In this regard, in one or more embodiments, the image 600 can correspond to the image frame 202.

In various embodiments, the processing device 108 of system 100 can employ a machine learning model to iteratively improve the performance of the scanning device 102. For example, the memory 212 and processor 210 can store and execute program instructions configured to generate model output by processing a set of training data for the machine learning model. In various embodiments, the set of training data comprises data gathered by the scanning device 102 including, but not limited to, images captured by imager 106 that comprise DPM indicia 116 and reflection shapes (such as reflection shape 602). Furthermore, the set of training data comprises sets of characteristics related to the surfaces of objects and their correlations to detected reflection shapes. For example, when the image processing component 204 analyzes images and detects reflection shapes (e.g., reflection shape 602) and/or the characteristics of the object 114 (e.g., the shape, curvature, measure of reflectance, surface composition, surface texture, and/or surface substrate) it can store this data in memory 212. The machine learning model can use the data in memory 212 to generate one or more portions of training data for the machine learning model and/or to generate model output.

In various embodiments, the machine learning model can iteratively improve the performance of the scanning device 102 by consistently updating the training data. For instance, as the scanning device 102 scans objects comprising DPM indicia (e.g., object 114 comprising DPM indicia 116), the processing device 108 can automatically update the training data such that the model learns to detect nuances in various reflection shapes and can more accurately direct the illumination unit 110 to make the correct adjustments. In various embodiments, the model output comprises a selection of an illumination mode from the plurality of illumination modes store in memory 212.

Figure 7:
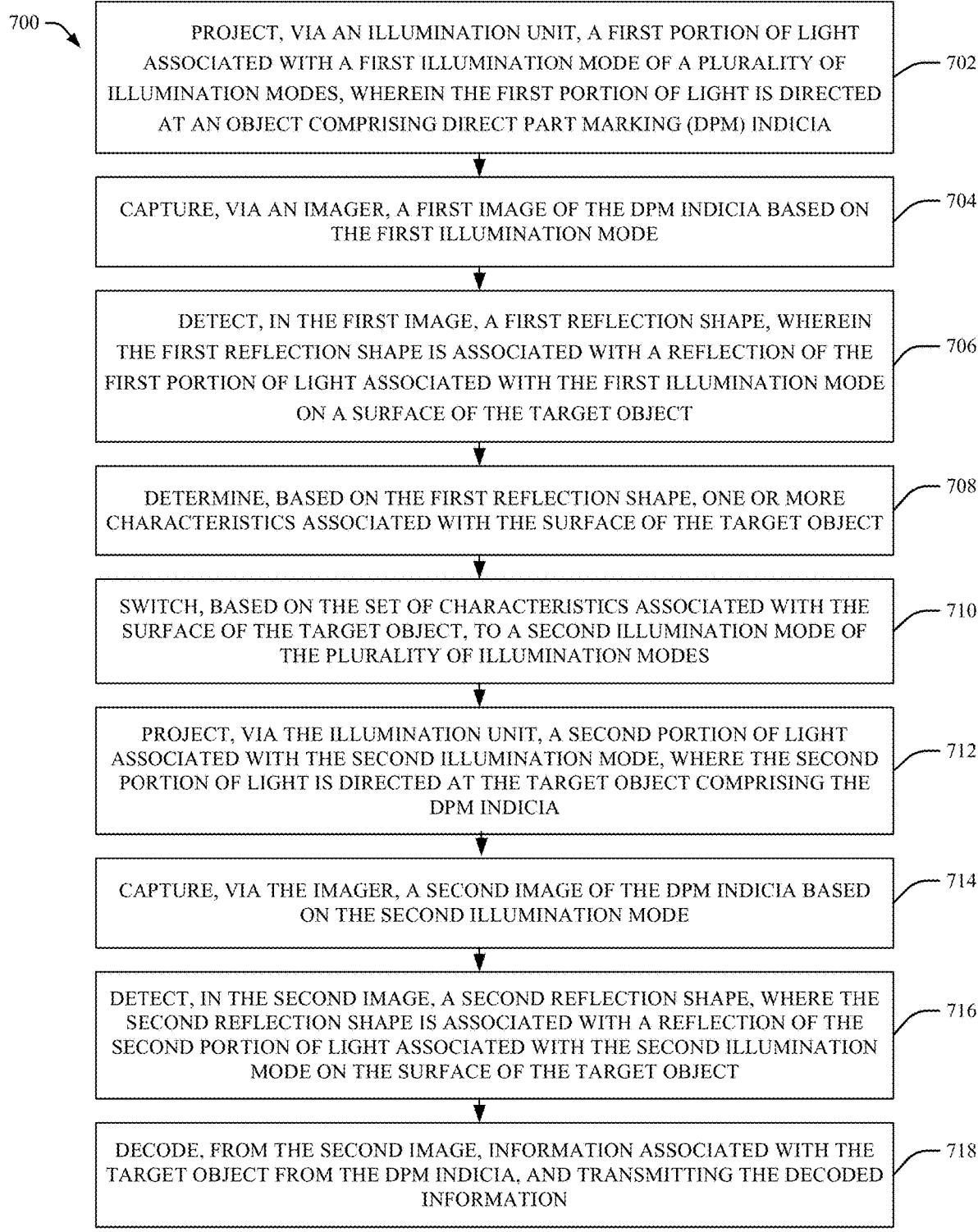
FIG. 7 is yet another flow diagram illustrating automatic illumination switching using reflections, in accordance with one or more embodiments described herein.

FIG. 7 illustrates a computer-implemented method 700 for automatically switching illumination based on reflections in accordance with one or more embodiments described herein. In one or more embodiments, the computer-implemented method 700 can be performed by the processing device 108. In one or more embodiments, the computer-implemented method 700 begins with projecting, via an illumination unit, a first portion of light associated with a first illumination mode of a plurality of illumination modes, where the first portion of light is directed at an object comprising direct part marking (DPM) indicia (step 702). In one or more embodiments, the processing device 108 can store a plurality of illumination modes, where an illumination mode is a configuration of the components of the illumination unit 110. In various embodiments, illumination modes can be preconfigured at the factory to suit basic scanning applications, however the system 100 can be configured to create, adjust, and store illumination modes based on processed image data.

In various embodiments, if a particular illumination mode (e.g., a first illumination mode) stored in memory 212 is employed by illumination unit 110 while capturing an image of DPM indicia 116 associated with object 114 and the image processing component 204 detects a reflection shape that is at least potentially impeding scanning and/or decoding of the DPM indicia 116 (e.g., reflection shape 602), the illumination adjustment component 206 can direct, via the processing device 108, the illumination unit 110 to make changes to the particular illumination mode in order to successfully scan and/or decode the DPM indicia 116. Furthermore, processing device 108 can correlate the detected impeding reflection shape to the adjusted illumination mode and store the correlation in memory 212 as a "preferred" illumination mode for that particular reflection shape. As such, when a similarly impeding reflection shape is detected in the future, the processing device 108 can instruct the illumination unit 110 to switch instantly to the preferred illumination mode stored in memory.

The computer-implemented method 700 further includes capturing, via an imager, a first image of the DPM indicia based on the first illumination mode (step 704). In various embodiments, indicia reading device 104 of scanning device 102 comprises an imager 106 along with a processing device 108. Furthermore, in various embodiments, the indicia reading device 104 is configured and arranged to work in conjunction with the illumination unit 110 such that the indicia reading device 104 can control the illumination unit 110 and the components therein. For example, indicia reading device 104 can direct the illumination unit 110 to adjust one or more components of the illumination unit 110 (e.g., the one or more light sources 302*a-n*, and filter module 306, etc.) to match a preconfigured illumination mode stored in memory 212. In various embodiments, indicia reading device 104 can control the activation timing of the components of the illumination unit 110 (e.g., the one or more light sources 302*a-n*) such that the object 114 containing DPM indicia 116 is properly illuminated while the imager 106 captures images within field of view 112.

The computer-implemented method 700 further includes detecting, in the first image, a first reflection shape, where the first reflection shape is associated with a reflection of the first portion of light associated with the first illumination mode on a surface of the object (step 706). In various embodiments, the image processing component 204 of processing device 108 can analyze images (e.g., image frame 202) to detect DPM indicia 116 and reflection shapes (e.g., reflection shape 602) on the surface of an object (e.g., object 114). Reflection shapes can be generated by various characteristics of the scanning device and the object itself. For example, the illumination unit 110 can comprise one or more light sources and/or an aimer (e.g., the one or more light sources 302*a-n*, and aimer 308 respectively) that can cause a reflection on the surface of the object. Furthermore, the object's shape, curvature, composition, and orientation, among other things, can contribute to how the light beams (e.g., from the one or more light sources 302*a-n*, and/or aimer 308) are reflected off the surface of the object to contribute to the reflection shape (e.g., reflection shape 602).

The computer-implemented method 700 further includes determining, based on the first reflection shape, one or more characteristics associated with the surface of the object (step 708). In various embodiments, the processing device 108 can determine one or more characteristics associated with the object (e.g., object 114) based on the reflection shape (e.g., reflection shape 602) detected by image processing component 204. The characteristics about the object that can be determined include, but are not limited to, the object's shape, curvature, measure of reflectance, surface composition, surface texture, and surface substrate. In various embodiments, said characteristics can be stored in memory 212 along with a correlation to the detected reflection shape. Storing these characteristics and correlations to reflection shapes improves the accuracy and efficiency of the scanning device such that appropriate illumination modes can be selected faster for future scans.

The computer-implemented method 700 further includes switching, based on the one or more characteristics associated with the surface of the object, to a second illumination mode of the plurality of illumination modes (step 710). In various embodiments, the memory 212 can store said characteristics along with correlations to their respective reflection shapes from previous scans such that appropriate illumination modes may be selected when these characteristics and reflection shapes are detected again in the future. This improves the speed and efficiency of the scanning device 102 such that fewer adjustments to the illumination unit's configuration (e.g., illumination unit 110) need to made in order to successfully scan and decode DPM indicia (e.g., DPM indicia 116).

The computer-implemented method 700 further includes projecting, via the illumination unit, a second portion of light associated with the second illumination mode, where the second portion of light is directed at the object comprising the DPM indicia (step 712). In various embodiments, once an illumination mode has been adjusted or switched (e.g., the configuration of illumination unit 110 has been altered), this newly configured illumination mode is used to illuminate the object and DPM indicia (e.g., object 114 comprising DPM indicia 116).

The computer-implemented method 700 further includes capturing, via the imager, a second image of the DPM indicia based on the second illumination mode (step 714). In various embodiments, once a new illumination mode has been selected, an additional image of the object 114 and the DPM indicia 116 is captured by the imager 106 while the new illumination mode is activated.

The computer-implemented method 700 further includes detecting, in the second image, a second reflection shape, where the second reflection shape is associated with a reflection of the second portion of light associated with the second illumination mode on the surface of the object (step 716). As in step 706, the image processing component 204 of processing device 108 can analyze an additional image (e.g., image frame 202) to detect DPM indicia 116 and reflection shapes (e.g., reflection shape 602) on the surface of an object (e.g., object 114). Reflection shapes can be generated by various characteristics of the scanning device and the object itself. For example, the illumination unit 110 can comprise one or more light sources and/or an aimer (e.g., the one or more light sources 302*a-n*, and aimer 308 respectively) that can cause a reflection on the surface of the object. Furthermore, the object's shape, curvature, composition, and orientation, among other things, can contribute to how the light beams (e.g., from the one or more light sources 302*a-n*, and/or aimer 308) are reflected off the surface of the object to contribute to the reflection shape.

Additionally or alternatively, there are instances in which the image processing component 204 does not detect a reflection shape, and, as such, the absence of a reflection shape can indicate that the DPM indicia is unobstructed and that no reflection shape is impeding the DPM indicia in the captured image. This is evidence that an appropriate illumination mode for the particular object has been activated. For example, if the image processing component 204 detects an impeding reflection shape in a first image and the processing device 108 directs the illumination unit 110 to change illumination modes (e.g., reconfigure one or more components of the illumination unit 110) and there is no detected reflection shape in a subsequently captured image, it is highly likely the correct illumination mode has been selected. In such instances, the decoder component 208 will attempt to decode the DPM indicia detected by image processing component 204, and, if successful, the processor 210 can compile the decoded indicia data as output data (e.g., output data 214).

The computer-implemented method 700 further includes decoding, from the second image, information associated with the object from the DPM indicia, and transmitting the decoded information (step 718). In various embodiments, when the image processing component 204 detects unobstructed DPM indicia (e.g., DPM indicia 116) the decoder component 208 can decode the encoded data contained in the DPM indicia. In various embodiments, the processing device 108 can compile the decoded data into output data 214 to be transmitted to a user computing device.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-Ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system, comprising:
a processor; and
a memory that stores executable instructions that, when executed by the processor, cause the processor to:
capture a first image of an object via an initial illumination mode, the first image comprising at least a representation of illumination reflected from the object, wherein the representation of the illumination obscures at least a portion of a direct part marking (DPM) indicia of the object;
detect a reflection shape of the representation of the illumination in the first image of the object;
determine, based on the reflection shape, one or more characteristics associated with the object;
select, based on the one or more characteristics associated with the object, an illumination mode from a plurality of illumination modes; and
project an illumination via an illumination unit based on the selected illumination mode to capture a second image of the object.

2. The system of claim 1, wherein the executable instructions further cause the processor to:
determine a shape of the object based on the reflection shape; and
select the illumination mode from the plurality of illumination modes based on the shape of the object.

3. The system of claim 1, wherein the executable instructions further cause the processor to:

determine a surface type of the object based on the reflection shape; and select the illumination mode from the plurality of illumination modes based on the surface type of the object.

4. The system of claim 1, wherein the executable instructions further cause the processor to:
generate a feature set associated with the reflection shape;
apply the feature set to a machine learning model to determine a classification for the object; and
select the illumination mode from a plurality of illumination modes based on the classification for the object.

5. The system of claim 1, wherein the executable instructions further cause the processor to:
generate a feature set associated with the reflection shape; and
apply the feature set to a machine learning model configured to determine the illumination mode from the plurality of illumination modes.

6. The system of claim 1, wherein the executable instructions further cause the processor to:
alter one or more illumination characteristics of the illumination unit based on the one or more characteristics associated with the object.

7. The system of claim 1, wherein the executable instructions further cause the processor to:
decode, from the second image, information associated with the DPM indicia on the object.

8. The system of claim 1, wherein the executable instructions further cause the processor to:
determine a degree of reflection in the second image; and
decode, from the second image, information associated with the DPM indicia in response to a determination that the degree of reflection satisfies a defined reflection level.

9. The system of claim 1, wherein the reflection shape is a first reflection shape, and wherein the executable instructions further cause the processor to:
detect a second reflection shape in the second image; and
decode, from the first image or the second image, information associated with the DPM indicia based on a comparison between the first reflection shape and the second reflection shape.

10. The system of claim 1, wherein the plurality of illumination modes comprises at least two of a polarized illumination mode, a diffused illumination mode, a direct illumination mode, and a dark-field illumination mode.

11. A computer-implemented method, comprising:
capturing a first image of an object via an initial illumination mode, the first image comprising at least a representation of illumination reflected from the object, wherein the representation of the illumination obscures at least a portion of a direct part marking (DPM) indicia of the object;
detecting a reflection shape of the representation of the illumination in the first image of the object;
determining, based on the reflection shape, one or more characteristics associated with the object;
selecting, based on the one or more characteristics associated with the object, an illumination mode from a plurality of illumination modes; and
projecting an illumination via an illumination unit based on the selected illumination mode to capture a second image of the object.

12. The computer-implemented method of claim 11, further comprising:
determining a shape of the object based on the reflection shape; and
selecting the illumination mode from the plurality of illumination modes based on the shape of the object.

13. The computer-implemented method of claim 11, further comprising:
determining a surface type of the object based on the reflection shape; and
selecting the illumination mode from the plurality of illumination modes based on the surface type of the object.

14. The computer-implemented method of claim 11, further comprising:
generating a feature set associated with the reflection shape;
applying the feature set to a machine learning model to determine a classification for the object; and
selecting the illumination mode from a plurality of illumination modes based on the classification for the object.

15. The computer-implemented method of claim 11, further comprising:
generating a feature set associated with the reflection shape; and
applying the feature set to a machine learning model configured to determine the illumination mode from the plurality of illumination modes.

16. The computer-implemented method of claim 11, further comprising:
altering one or more illumination characteristics of the illumination unit based on the one or more characteristics associated with the object.

17. The computer-implemented method of claim 11, further comprising:
decoding, from the second image, information associated with the DPM indicia on the object.

18. The computer-implemented method of claim 11, further comprising:
determining a degree of reflection in the second image; and
decoding, from the second image, information associated with the DPM indicia in response to a determination that the degree of reflection satisfies a defined reflection level.

19. The computer-implemented method of claim 11, wherein the reflection shape is a first reflection shape, and the computer-implemented method further comprising:
detecting a second reflection shape in the second image; and
decoding, from the first image or the second image, information associated with the DPM indicia based on a comparison between the first reflection shape and the second reflection shape.

20. A computer program product comprising at least one non-transitory computer-readable storage medium having program instructions embodied thereon, the program instructions executable by a processor to cause the processor to:
capture a first image of an object via an initial illumination mode, the first image comprising at least a representation of illumination reflected from the object, wherein the representation of the illumination obscures at least a portion of a direct part marking (DPM) indicia of the object;
detect a reflection shape of the representation of the illumination in the first image of the object;
determine, based on the reflection shape, one or more characteristics associated with the object;

select, based on the one or more characteristics associated with the object, an illumination mode from a plurality of illumination modes; and project an illumination via an illumination unit based on the selected illumination mode to capture a second image of the object.

\* \* \* \* \*